United States Patent
Watanabe et al.

(10) Patent No.: US 10,194,081 B2
(45) Date of Patent: Jan. 29, 2019

(54) CAMERA DEVICE, COMPARTMENT-INTERIOR IMAGING SYSTEM, AND COMPARTMENT-INTERIOR-INFORMATION ACQUISITION DEVICE

(71) Applicant: Toshiba Lifestyle Products & Services Corporation, Ome-shi, Tokyo (JP)

(72) Inventors: Kota Watanabe, Ome (JP); Hirokazu Izawa, Ome (JP); Kazuhiro Furuta, Ome (JP); Yuuki Murutani, Ome (JP)

(73) Assignee: TOSHIBA LIFESTYLE PRODUCTS & SERVICES CORPORATION, Ome-Shi, Tokyo (JP)

( * ) Notice: Subject to any disclaimer, the term of this patent is extended or adjusted under 35 U.S.C. 154(b) by 405 days.

(21) Appl. No.: 14/997,140

(22) Filed: Jan. 15, 2016

(65) Prior Publication Data

US 2016/0134811 A1    May 12, 2016

Related U.S. Application Data

(63) Continuation of application No. PCT/JP2014/066545, filed on Jun. 23, 2014.

(30) Foreign Application Priority Data

Jul. 16, 2013   (JP) .................................. 2013-147563

(51) Int. Cl.
  *G05B 15/02*   (2006.01)
  *H04N 5/232*   (2006.01)
  (Continued)

(52) U.S. Cl.
  CPC ......... *H04N 5/23241* (2013.01); *G03B 15/03* (2013.01); *G03B 17/38* (2013.01); *H04N 5/232* (2013.01); *H04N 7/183* (2013.01)

(58) Field of Classification Search
  CPC .... H04N 5/23241; H04N 7/183; H04N 5/232; G03B 15/03; G03B 17/38
  See application file for complete search history.

(56) References Cited

U.S. PATENT DOCUMENTS

2003/0076440 A1*  4/2003  Terane ................. H04N 5/2251
                                                    348/373
2003/0174154 A1*  9/2003  Yukie ................ G06F 17/30873
                                                    715/700

(Continued)

FOREIGN PATENT DOCUMENTS

CN   202907061 U   4/2013
GB   2 400 911    10/2004
(Continued)

OTHER PUBLICATIONS

Korean Office Action (with English Translation) issued in KR 10-2015-7037086 dated Jun. 23, 2017.
(Continued)

*Primary Examiner* — Sathyanaraya V Perungavoor
*Assistant Examiner* — Howard D Brown, Jr.
(74) *Attorney, Agent, or Firm* — DLA Piper LLP US

(57) ABSTRACT

A camera device of one embodiment is provided with an image capturing unit configured to capture image of a room interior; a receiving unit configured to receive an image capturing instruction for capturing image of the room interior by way of a home appliance; and a camera-side controller being configured to standby in a low-power mode consuming relatively less electric power compared to a normal-operation mode and being configured to capture image of the room interior through the image capturing unit by returning to the normal-operation mode when the receiving unit receives the image capturing instruction.

5 Claims, 8 Drawing Sheets

Figure 1:
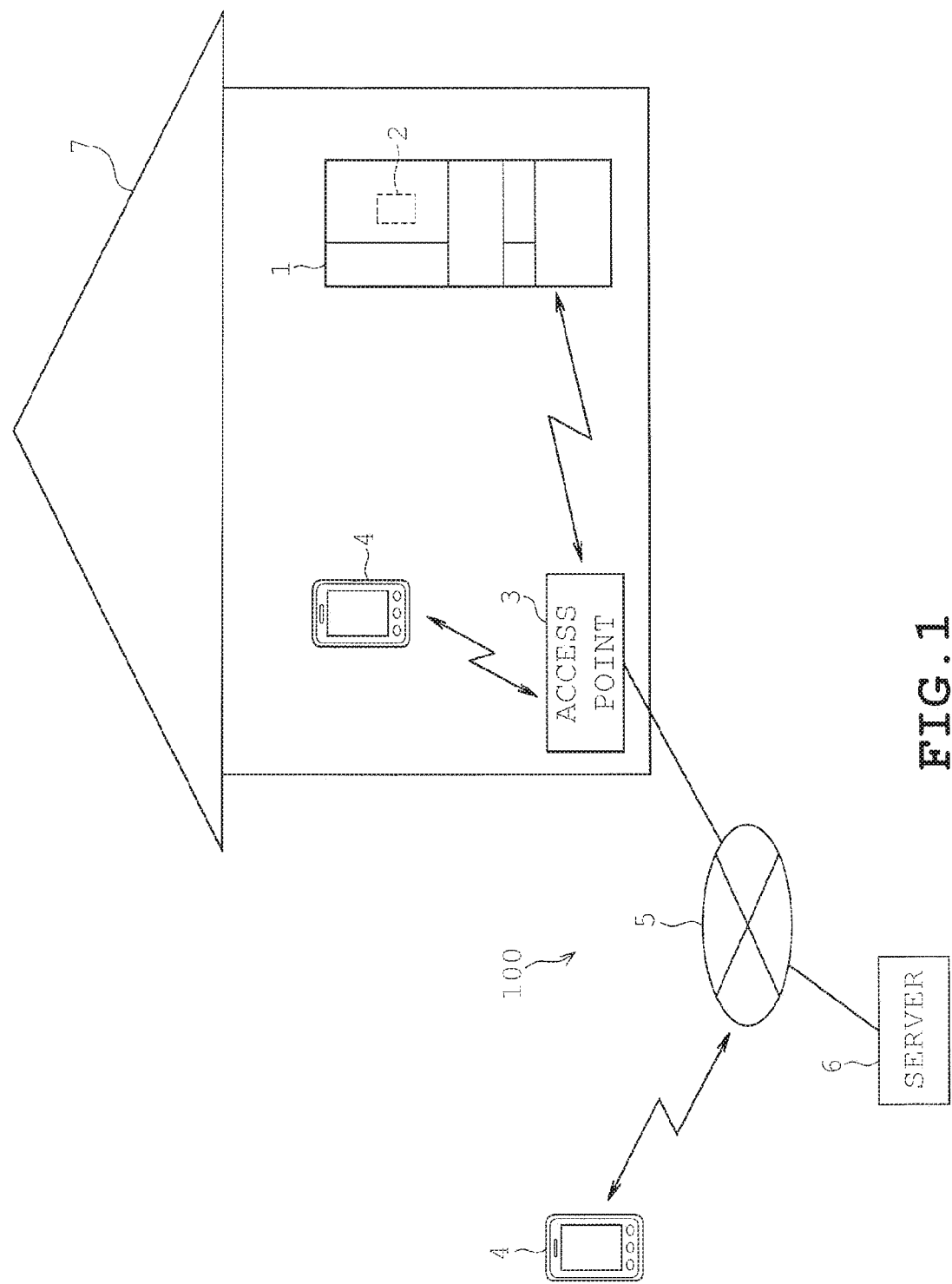

(51) Int. Cl.
*G03B 17/38* (2006.01)
*G03B 15/03* (2006.01)
*H04N 7/18* (2006.01)

(56) References Cited

U.S. PATENT DOCUMENTS

| | | | |
|---|---|---|---|
| 2004/0212678 A1 | 10/2004 | Cooper et al. | |
| 2008/0297615 A1 | 12/2008 | Kagawa | |
| 2013/0108076 A1 | 5/2013 | Chu | |
| 2016/0327921 A1* | 11/2016 | Ribbich | F24F 11/30 |

FOREIGN PATENT DOCUMENTS

| | | | | |
|---|---|---|---|---|
| JP | 2002-156181 | | 5/2002 | |
| JP | 2002-243335 | | 8/2002 | |
| JP | 2002-340471 | | 11/2002 | |
| JP | 2004-180077 | | 6/2004 | |
| JP | 2005-217549 | | 8/2005 | |
| JP | 2005-286766 | | 10/2005 | |
| JP | 2005286766 A | * | 10/2005 | H04N 7/173 |
| JP | 2006-279327 | | 10/2006 | |
| JP | 2006279327 A | * | 10/2006 | H04N 5/225 |
| JP | 2010-261620 | | 11/2010 | |
| JP | 2012-226748 | | 11/2012 | |
| JP | 2013-102428 | | 5/2013 | |
| WO | WO 2006/048987 | | 5/2006 | |

OTHER PUBLICATIONS

English language Abstract of JP 2002-243335 published on Aug. 28, 2002.
English language Abstract of JP 2002-156181 published on May 31, 2002.
Korean Office Action (with English Translation) issued in KR 10-2015-7037086 dated Sep. 28, 2016.
Extended European Search Report issued in EP 14 82 5813 dated Jan. 3, 2017.
Japanese Office Action (with English Translation) issued in JP 2013-147563 dated Aug. 1, 2017.
International Search Report issued in PCT/JP2014/066545 dated Sep. 9, 2014.
International Preliminary Report on Patentability and Written Opinnion issued in PCT/JP2014/066545 dated Jan. 19, 2016 and dated Sep. 9, 2014, respectively.
English language abstract and machine translation of JP 2005-286766 published on Oct. 13, 2005.
English language abstract and machine translation of JP 2006-279327 published on Oct. 12, 2006.
English language machine translation of WO 2006/048987 published on May 11, 2006.
English language abstract and machine translation of JP 2004-180077 published on Jun. 24, 2004.
English language abstract and machine translation of JP 2013-102428 published on May 23, 2013.
Taiwanese Office Action issued in TW 103123727 dated Mar. 14, 2016 with English language translation.
English language Abstract of CN 202907061 U published on Apr. 24, 2013.
English language abstract and machine translation of JP 2012-226748 published on Nov. 15, 2012.
Japanese Office Action issued in JP 2013-147563 dated Mar. 13, 2018.
English language Abstract of JP 2002-340471 published Nov. 27, 2002.
English language Abstract of JP 2010-261620 published Nov. 18, 2010.

* cited by examiner

CAMERA DEVICE, COMPARTMENT-INTERIOR IMAGING SYSTEM, AND COMPARTMENT-INTERIOR-INFORMATION ACQUISITION DEVICE

CROSS-REFERENCE TO RELATED APPLICATION(S)

This application is a continuation to an International Application No. PCT/JP2014/066545, filed on Jun. 23, 2014 which is based upon and claims the benefit of priority from Japanese Patent Application No. 2013-147563, filed on, Jul. 16, 2013 the entire contents of which are incorporated herein by reference.

FIELD

Embodiments disclosed herein relate to a camera device, an in-room image capturing system, and an in-room information acquiring device.

BACKGROUND

Conventionally, systems have been known in which information of food, etc. stored in a refrigerator for example can be acquired from remote locations by providing a camera for example in the refrigerator.

However, since it is not possible to know when instruction for acquiring in-room information will be given from a remote user, the system has been required to keep running in a state capable of receiving such instructions which may be given at any given time and thus, resulted in increased electric power consumption.

BRIEF DESCRIPTIONS OF THE DRAWINGS

FIG. 1 schematically illustrates one embodiment of an in-room image capturing system.

Figure 2:
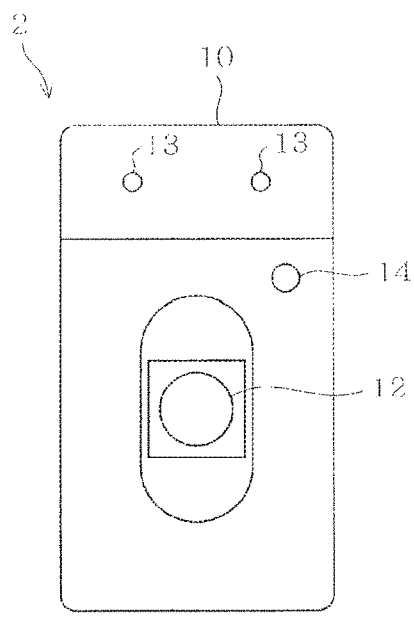

FIG. 2 schematically illustrates an external look of one embodiment of a camera device.

Figure 3:
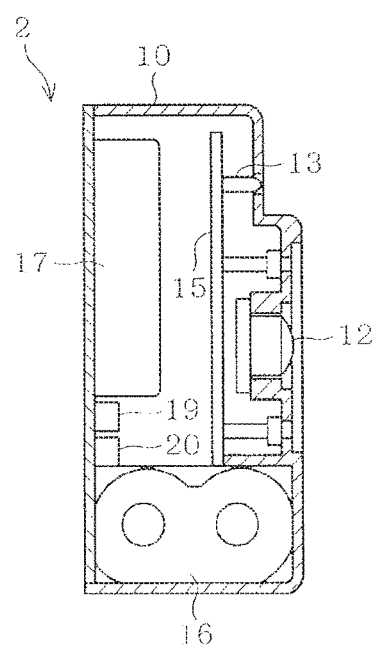

FIG. 3 schematically illustrates the interior of one embodiment of the camera device.

Figure 4:
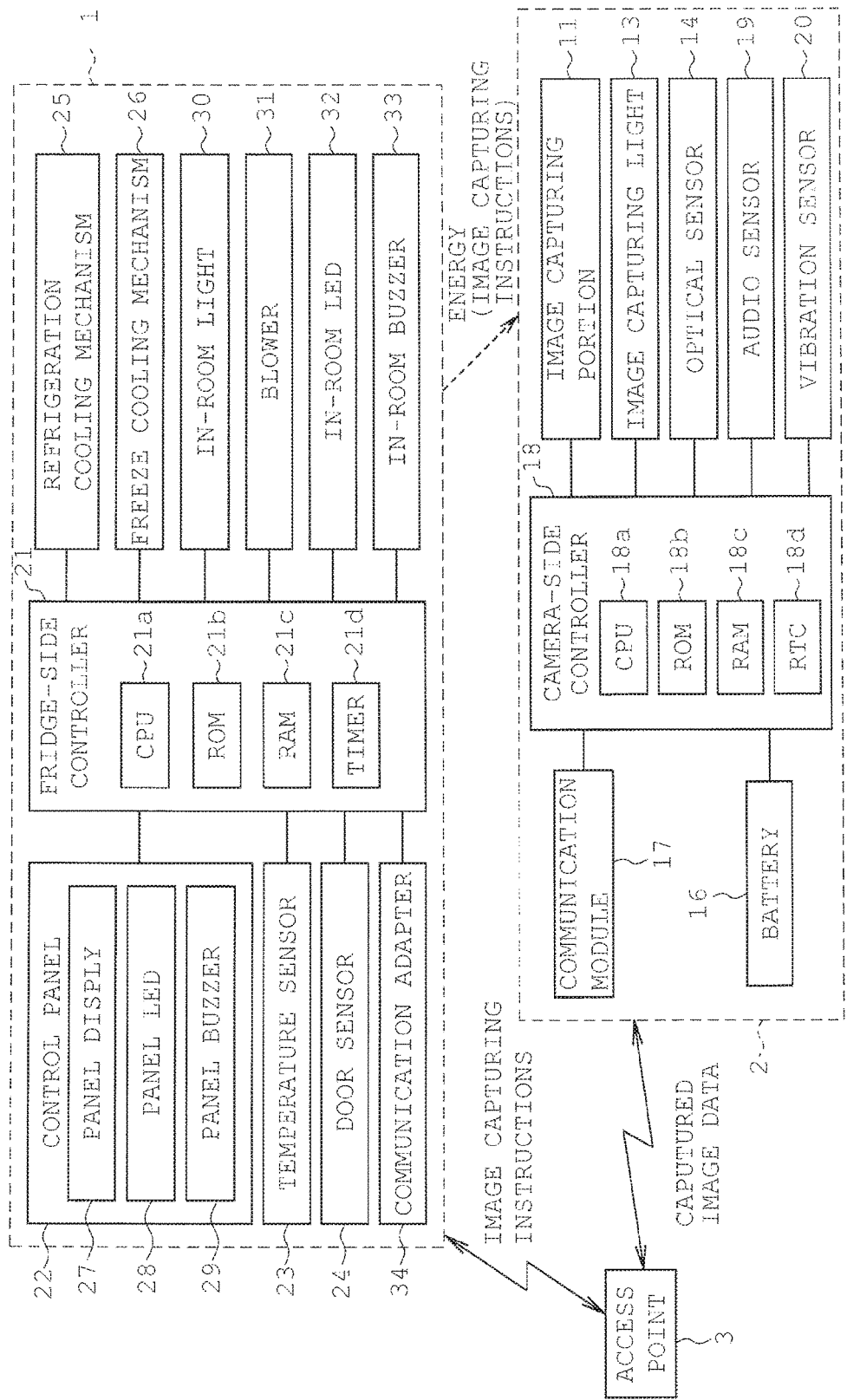

FIG. 4 schematically illustrates an electrical configuration of one embodiment of the camera device and an in-room image capturing system.

Figure 5:
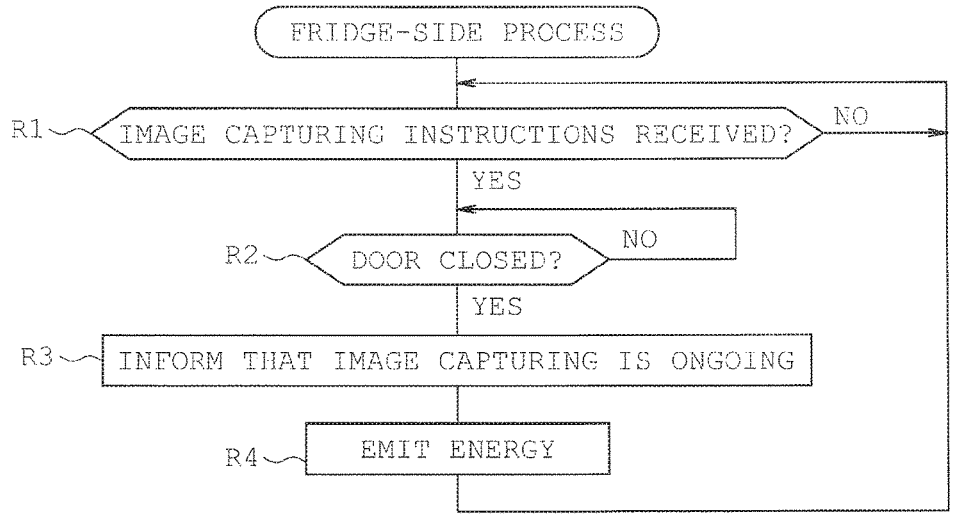

FIG. 5 indicates one embodiment of a flow of process executed in a refrigerator.

Figure 6:
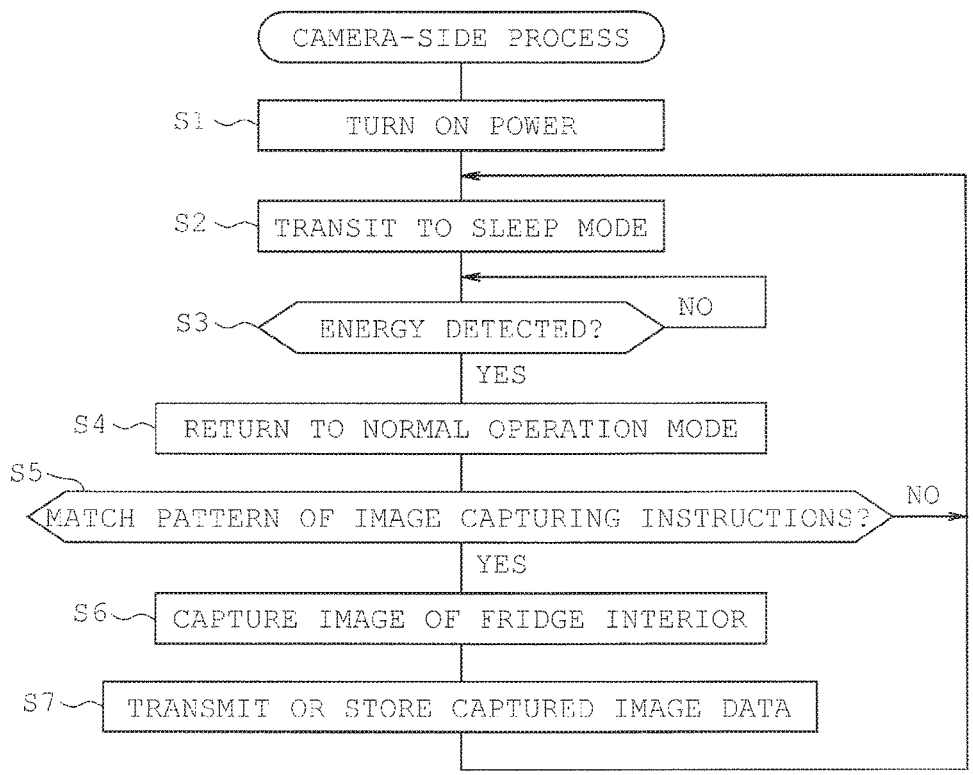

FIG. 6 indicates one embodiment of a flow of process executed in a camera device.

Figure 7:
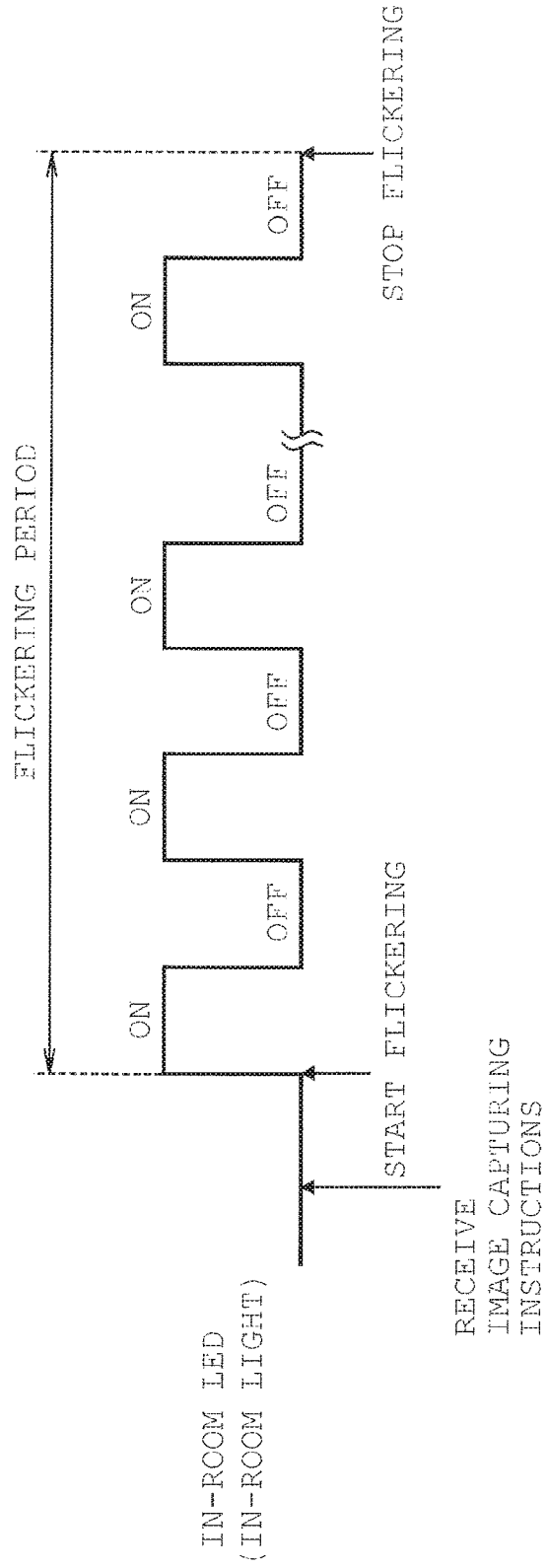

FIG. 7 indicates one example of a flickering pattern which is used to transmit an image capturing instruction by optical energy in one embodiment.

Figure 8:
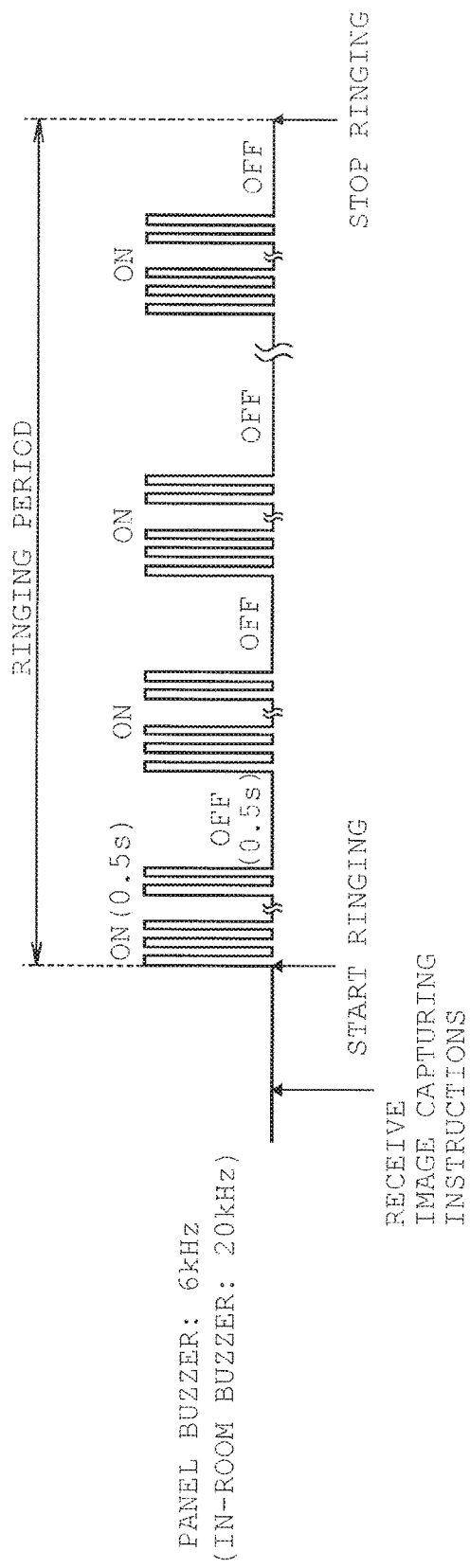

FIG. 8 indicates one example of a ringing pattern which is used to transmit the image capturing instruction by sound energy in one embodiment.

Figure 9:
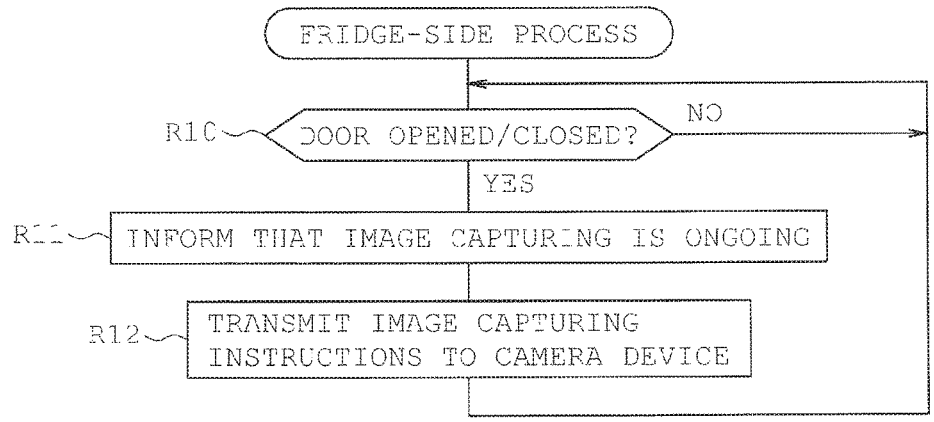

FIG. 9 indicates one embodiment of a flow of process executed in a refrigerator when the image capturing instruction is transmitted using vibration energy.

Figure 10:
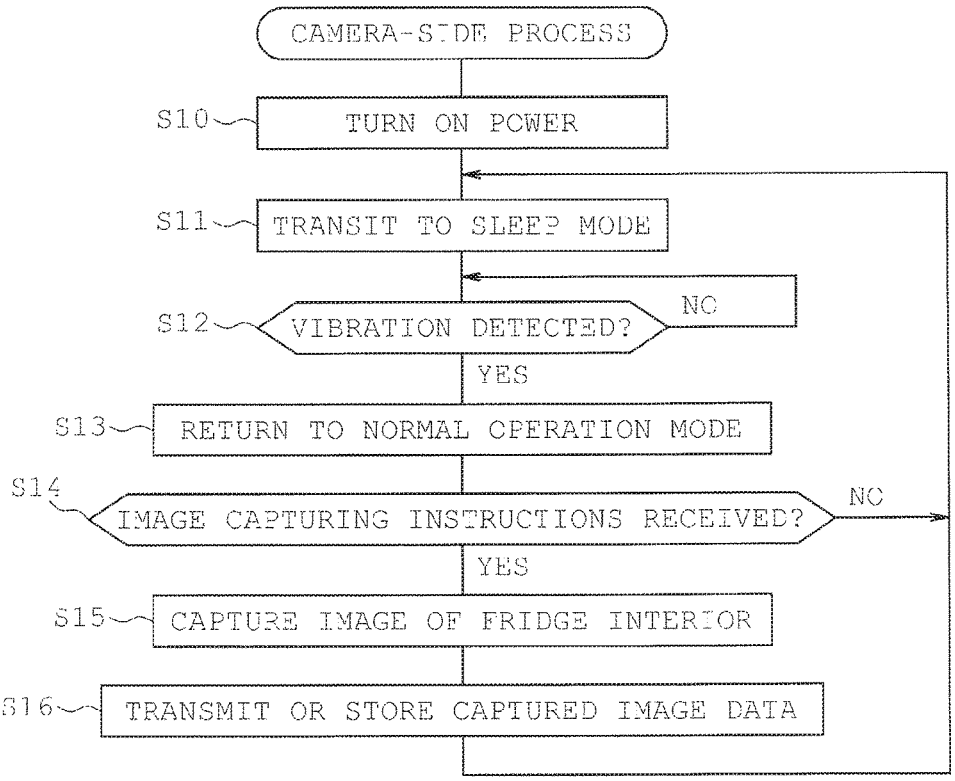

FIG. 10 indicates one embodiment of a flow of process executed in a camera device when the image capturing instruction is transmitted using vibration energy.

Figure 11:
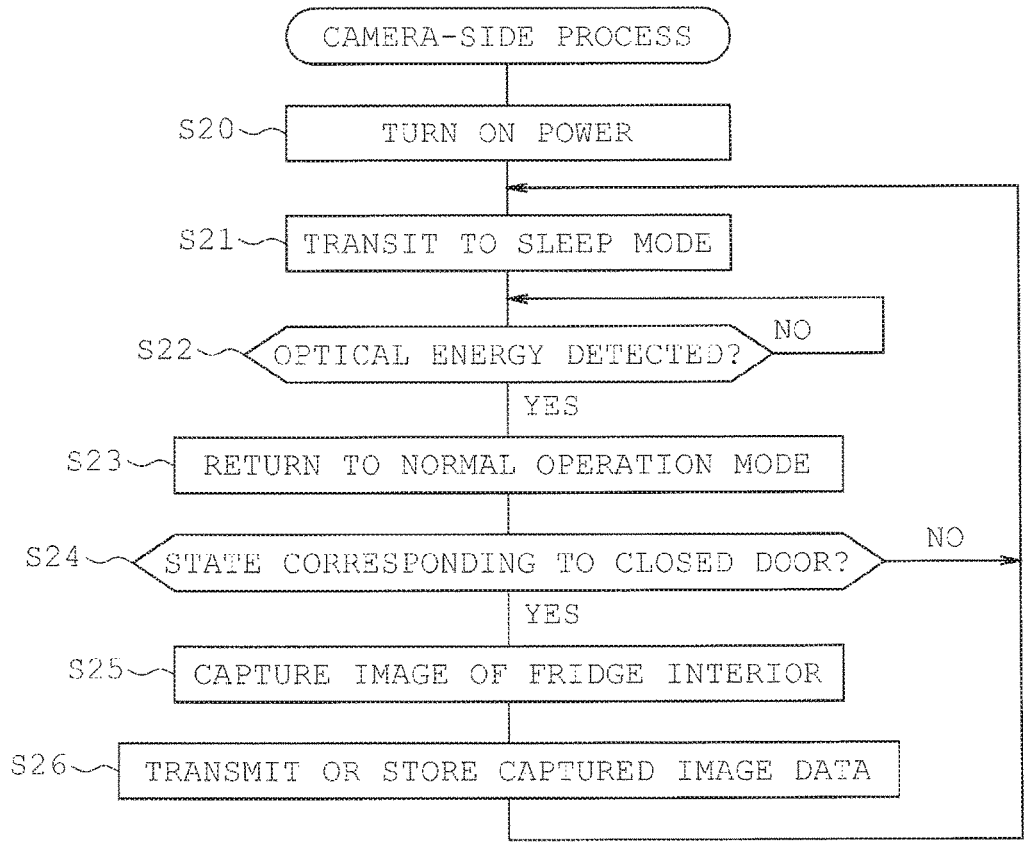

FIG. 11 indicates one embodiment of a flow of process executed in a camera device when the image capturing instruction is transmitted using optical energy and vibration energy.

DESCRIPTION

A camera device of one embodiment is provided with an image capturing unit configured to capture image of a room interior; a receiving unit configured to receive an image capturing instruction for capturing image of the room interior by way of a home appliance; and a controller being configured to standby in a low-power mode consuming relatively less electric power compared to a normal-operation mode and being configured to capture image of the room interior through the image capturing unit by returning to the normal-operation mode when the receiving unit receives the image capturing instruction.

A description will be given on one embodiment with reference to FIGS. 1 to 11.

As illustrated in FIG. 1, an in-room image capturing system 100 of the present embodiment is configured by a refrigerator 1 being one example of a home appliance, a camera device 2 for capturing an in-room image, an access point 3 for communicating with the refrigerator 1 side, a mobile terminal 4 serving as an operation terminal, etc. The access point 3 is connected to an external network 5 and is configured to communicably interconnect the mobile terminal 4 and a server 6, etc. located in remote locations with the refrigerator 1 side by way of the external network 5. In the present embodiment, a Bluetooth (registered trademark) wireless communication is exchanged between the refrigerator 1 and the access point 3; between the access point 3 and the mobile terminal 4; and between the camera device 2 and the access point 3.

The mobile terminal 4 is an operation terminal configured to input image capturing instruction to the camera device 2 for capturing in-room images. Examples of the mobile terminal 4 envisaged in the present embodiment include the so-called smart phone (highly functional mobile phone). Examples of the operation terminal include, apart from the mobile terminal 4 discussed herein, a tablet PC for example. When the mobile terminal 4 is located inside a residence 7, the mobile terminal 4 is communicably connected to the access point 3 by a close-range wireless communication. When the mobile terminal 4 is located outside the residence 7, the mobile terminal 4 is communicably connected to the access point 3 by a wide-range wireless communication byway of external network 5. The mobile terminal 4 is further capable of connecting to the access point 3 by way of the external network 5 through wide-range communication even when located inside of the residence 7. The mobile terminal 4 located inside the residence 7 is further capable of communicating directly with the refrigerator 1 side without the intervention of the access point 3

The server 6 is configured by a computer system known in the art. The server 6 stores information (such as an IP address) for accessing the refrigerator 1. The server 6 further stores captured image data containing images captured by the camera device 2 in the present embodiment. Though only the refrigerator 1 is illustrated in FIG. 1, other home appliances such as an air conditioner, etc. not illustrated is also interconnected over a network.

By interconnecting the home appliances over a network, it is possible to: visualize the electric power consumption of each home appliance for the user's reference; shift the peak of electric power consumption during the day time in summer for example when there is a large demand for electric power; perform various controls of electric power consumption such as peak cutting in which a momentary use of electric power exceeding the rated level in a general household is inhibited; perform failure diagnosis of home appliances, etc. The network of home appliances provides a user friendly, convenient, and an easy to use system by offering functionalities such as those exemplified above. It becomes further possible to check the status (status of things stored) inside the compartments of the refrigerator 1 by installing the camera device 2 inside the refrigerator 1 for example. By storing various information and captured image data, etc. in the server 6, it is possible to view such information through the mobile terminal 4, etc. over the external network 5 even from remote locations.

Next, a description is given on the camera device 2.

The camera device 2 is configured by a body 10 shaped like a cuboid and an image capturing portion 11 (see FIG. 4) including a lens 12 provided on the body 10 in an exposed manner as illustrated in FIGS. 2 and 3. In the present embodiment, a couple of image capturing lights 13 and an optical sensor 14 are further provided on the surface of the body 10 in an exposed manner. The lens 12, image capturing lights 13, and the optical sensor 14 may be hidden under a cover, etc. instead of being exposed outside the body 10. A description is given hereinafter with an assumption that the exposed side of the lens 12, etc. (the right side in FIG. 3) is the front surface of the camera device 2 and the opposite side (the left side in FIG. 3) as is the rear surface.

As illustrated in FIG. 3, a control substrate 15, a battery 16, a communication module 17, a sound sensor 19, a vibration sensor 20, etc. are stored inside the body 10 of the camera device 2. The lens 12, the image capturing portion 11 provided with an image capturing element not illustrated, image capturing lights 13, and a camera-side controller 18 (see FIG. 4) are provided on the control substrate 15. The image capturing element is configured by elements such as CCD and CMOS known in the art. The image capturing lights 13 are configured by LED. Though not illustrated, power switches are provided to the camera device 2.

The battery 16 supplies electric power to the control portion, the communication module 17, the optical sensor 14, the sound sensor 19, the vibration sensor 20, etc. That is, the camera device 2 is driven by the battery 16 installed therein. The camera device 2 is capable of running without power plug cable, etc. and thus, may be installed in any location. In the present embodiment, the camera device 2 is installed inside the refrigeration chamber as described above.

The communication module 17 transmits the image data of the fridge interior captured by the image capturing portion 11 to the mobile terminal 4, the server 6, etc. byway of the access point 3. The captured image data is transmitted to the server 6 to store the captured image data to the server 6. The captured image data contains in-room images. Examples of the captured image data include an image data (still image, moving image) of known formats such as a bit map format and JPEG/MPEG format and compressed/encrypted forms of such data as well as converted forms of such data converted by image processing. The image data may come in any format as long the interior of a room can be viewed through the mobile terminal or the like.

As illustrated in FIG. 4, the camera-side controller 18 is configured by a microcomputer provided with a CPU 18a, a ROM 18b, a RAM 18c, RTC 18d, etc. and is responsible for the overall control of the camera device 2. More specifically, the camera-side controller 18 performs controls such as: a control of timing of capturing images by the image capturing portion 11; a control to prepare image capturing environment (control of illuminating the image capturing light 13); transmitting the captured image data through the communication module 17; and a control for receiving (accepting) a later described image capturing instruction by each of the sensors. In the present embodiment, the camera-side controller 18 is also configured to perform image processing such as modification of the captured images. The camera-side controller 18 serves as a controller.

The optical sensor 14 connected to the camera-side controller 18 is a so-called illuminance sensor configured to detect the illuminance of the periphery of the camera device 2. More specifically, the optical sensor 14 is configured to detect optical energy (optical energy emitted from a later described in-room LED in the present embodiment) belonging to a predetermined wavelength band. The optical energy detected by the optical sensor 14 is converted into electric signal and outputted to the camera-side controller 18.

The sound sensor 19 is configured to detect sound produced in the periphery of the camera device 2. More specifically, the sound sensor 19 is configured to detect sound energy (sound energy produced by a later described panel buzzer 29 and in-room buzzer 33 in the present embodiment) produced in a certain frequency band. The sound energy detected by the sound sensor 19 is converted into electric signal and outputted to the camera-side controller 18.

The vibration sensor 20 is configured to detect vibration of the camera device 2. The vibration sensor 20 is configured by a 3-axis acceleration sensor for example. The vibration energy detected by the vibration sensor 20 is converted into electric signal and outputted to the camera-side controller 18. The camera-side controller 18 is configured to detect vibration of the camera device 2 based on acceleration.

As later described in detail, the optical sensor 14, the sound sensor 19, and the vibration sensor 20 are sensors configured to detect physical energy and serve as a receiving unit configured to receive the image capturing instruction. It is not mandatory to provide the optical sensor 14, the sound sensor 19, and the vibration sensor 20 at the same time. If the image capturing instruction is only given through optical energy for example, it is possible to only provide the optical sensor 14.

The camera-side controller 18 is configured to judge whether or not the detected energy is an image capturing instruction based on intensity and pattern of the detected energy. In the present embodiment, image capturing instruction given by the user is provided as energy produced according to a predetermined pattern. The camera-side controller 18 serves as a judging unit configured to judge whether or not the pattern of energy detected by each sensor matches the pattern indicated in the image capturing instruction.

The camera device 2 configured as described above normally stands by in low-power mode which consumes relatively less electric power compared to the normal-operation mode. When receiving the image capturing instruction, the camera device 2 returns to the normal-operation mode and captures an in-room image. In the present embodiment, the camera device 2 is provided inside the refrigeration chamber and thus, an image inside the refrigeration chamber is captured.

The refrigerator 1 in which the camera device 2 is installed is provided with a fridge-side controller 21. The fridge-side controller 21 is configured by a microcomputer provided with a CPU 21a, a ROM 21b, a RAM 21c, timer 21d, etc. and is responsible for the overall control of the refrigerator 1. More specifically, the fridge-side controller 21 is configured to control the operational status of the refrigeration cooling mechanism 25 and freeze cooling mechanism 26 that configure the refrigeration cycle known in the art based on the temperature inside the chambers detected by a temperature sensor 23 or opened/closed state of the door detected by a door sensor 24, so that the operational status specified from the control panel 22 can be achieved.

The control panel 22 is provided with a panel display 27, a panel LED 28, and a panel buzzer 29. The panel display 27 displays the specified settings, etc. The panel LED 28 is provided to illuminate the operation switches and operational status indicators, etc. The panel buzzer 29 is configured by a piezoelectric buzzer for example and notifies the type of operations made by producing a sound (sound energy) depending upon the operation made. In the present embodiment, the panel buzzer 29 is capable of outputting a sound of 6 kHz. As later described, the panel buzzer 29 also serves as a transmitting unit configured to produce sound energy in order to transmit image capturing instruction to the camera device 2.

An in-room light 30 is provided inside the refrigeration chamber, etc. which is illuminated when the door is opened. That is, the in-room light 30 produces optical energy. The in-room light 30 is capable of flickering under the control of the fridge-side controller 21. A blower 31 is provided for circulating cool air inside the refrigerator 1 when operated normally. The blower 31 is capable of producing sound energy such as wind noise and motor sound by increasing the rotation count to be greater than the rotation count observed during normal operation.

The in-room LED 32 is configured to produce optical energy for transmitting image capturing instruction to the camera device 2. In the present embodiment, the in-room LED 32 is configured to produce light belonging to a certain frequency band capable of being detected by the optical sensor 14. The in-room LED 32 is capable of flickering in a certain pattern. The in-room LED 32 serves as a transmitting unit configured to transmit image capturing instruction to the camera device 2 side by flickering in a pattern corresponding to the image capturing instruction. The in-room light 30, also configured to produce optical energy, may be used as the transmitting unit instead of the in-room LED 32. When the in-room light 30 is used as the transmitting unit, it is not necessary to provide the in-room LED 32.

The in-room buzzer 33 comprises a piezoelectric buzzer for example configured to produce sound energy for transmitting image capturing instruction to the camera device 2. The in-room buzzer 33 is capable of outputting sound of 20 kHz for example (i.e. sound beyond the audible range). While the sound produced by the in-room buzzer 33 is detectable by the sound sensor 19, it is not audible to human. It is not necessary to provide the in-room buzzer 33 when the panel buzzer 29 is used as the transmitting unit or when the blower 31 is used as the transmitting unit. The in-room buzzer serves as the transmitting unit.

The communication adaptor 34 is configured to exchange communication with the access point 3 and with the mobile terminal 4, etc. located in the room and is provided detachably to the refrigerator 1 in the present embodiment. Though only the refrigerator 1 is illustrated in FIG. 1, the communication adaptor 34 is also provided to other home appliances such as an air conditioner to establish a network of home appliances. The communication adaptor 34 serves as a communication unit. The communication adaptor 34 is further configured to be capable of communicating directly with the camera device 2 without the intervention of the access point 3. The communication adaptor 34 is also used for visualization of system status, etc. as described earlier and thus, is basically operative while the refrigerator 1 is in service.

Next, a description is given on the operation of the above described configuration.

It is possible to capture an image inside the room of the residence 7 or an image inside the refrigeration chamber, etc. by providing the camera device 2 described above. It is possible to acquire the captured image data at any given timing from a remote location by transmitting image capturing instruction to the camera device 2 from the mobile terminal 4 over the external network 5. As it is not possible to predict when the image capturing instruction will be transmitted, the communication module 17 needs to be constantly operative, which increases electric power consumption. As a result, the battery 16 needs to be replaced (or charged) in a day or few days.

Thus, the camera device 2 and the in-room image capturing system 100 is configured to suppress electric power consumption while enabling acquisition of in-room information such as captured image data at any given timing by transmitting image capturing instruction from home appliances such as the refrigerator 1 (by cooperating with the home appliances). Examples of transmitting image capturing instruction using: optical energy; sound energy; vibration energy; and a combination of the foregoing (optical energy and vibration energy) will be described one by one for ease of explanation.

<Using Optical Energy>

When transmitting image capturing instruction using optical energy, the refrigerator 1 executes a fridge-side process indicated in FIG. 5 and the camera device 2 executes a camera-side process indicated in FIG. 6.

In the fridge-side process indicated in FIG. 5, The refrigerator 1 judges whether the image capturing instruction has been received (R1). The image capturing instruction given by the user is transmitted by way of the access point 3 and received by the refrigerator 1 at the communication adaptor 34 (see FIG. 4). The refrigerator 1 stands by when it has not received the image capturing instruction (R1: NO). When receiving the image capturing instruction, on the other hand (R1: YES), the refrigerator 1 judges whether the door is closed (R2), and when the door is opened (R2: NO), the refrigerator 1 stands by until the door is closed.

When the door is closed (R2: YES), the refrigerator 1 issues an alert through the control panel 22, etc. that image is being captured (R3) and thereafter produces energy (which is optical energy in this case). At step R3, the refrigerator 1 produces optical energy by flickering the in-room LED 32 in a certain pattern corresponding to the image capturing instruction. More specifically, the refrigerator 1 repeatedly turns the in-room LED 32 ON/OFF as illustrated in FIG. 7 for a preset flickering period when receiving the image capturing instruction. That is, in the present embodiment, a flickering pattern in which optical energy is flickered at 5 Hz is used as the image capturing instruction. This flickering pattern is a pattern which will not occur when the refrigerator 1 is under normal use. The in-room light 30 is illuminated when the door is opened. However, the door is not expected to be opened and closed at 5 Hz (0.2 S period) and thus, there is no possibility of the opening and closing of the door to be misunderstood as the image capturing instruction.

When power is turned ON (S1) in the camera-side process indicated in FIG. 6, the camera device 2 proceeds to the sleep mode (S2). The sleep mode is one example of a low-power mode which consumes less power compared to a normal operation mode. Then, the camera device 2 judges whether energy has been detected (S3). More specifically, the camera-side controller 18 stands by in the sleep mode at step S3, and judges whether or not detection of optical energy has been notified by the optical sensor 14. The notification is issued as an interruption signal, etc. known in the field of microcomputers.

When energy has not been detected (S3: NO), the camera device 2 stands by, whereas when energy has been detected (S3: YES), transition is made to revert to the normal operation mode (S4). Then, judgment is made as to whether the pattern of the detected energy matches the pattern of image capturing instruction (S5). More specifically, the camera device 2 detects the ON/OFF edges of optical energy and when the edges are detected 10 or more times in 5 seconds for example, the pattern is judged as the image capturing instruction.

When the detected pattern matches the pattern of the image capturing instruction (S5: YES), the camera device 2 captures the in-room image (S6) and transmits the captured image data to the mobile terminal 4 etc. or stores the captured image data to the server 6, etc. (S7) and a transition is thereafter made to the sleep mode of step S2. The camera device 2 also makes a transition to the sleep mode when the detected pattern does not match the pattern of the image capturing instruction (S5: NO). It is thus, possible to transmit the image capturing instruction to the camera device 2 in sleep mode through optical energy.

<Using Sound Energy>

When transmitting the image capturing instruction using sound energy, the refrigerator 1 executes the fridge-side process indicated in FIG. 5 and the camera device 2 executes the camera-side process indicated in FIG. 6 as was the case when using optical energy. A description will be given hereinafter on the differences of the processes.

When receiving the image capturing instruction (R1: YES), the refrigerator 1 judges whether the door is closed (R2: YES), and after issuing a notification that image capturing is ongoing (R3), energy (sound energy in this case) is produced. In this example, the refrigerator 1 produces sound energy by ringing the panel buzzer 29 in a certain pattern. More specifically, the refrigerator 1 rings the panel buzzer 29 so as to be turned ON (ring) for 0.5 seconds and turned OFF (stop) for 0.5 seconds for a preset ringing period when receiving the image capturing instruction as illustrated in FIG. 8. That is, in the present embodiment, a ringing pattern being configured to ring intermittently at a predetermined period (0.5 second period) and belonging to a preset frequency band of 6 kHz (non-audible region of 20 kHz when the in-room buzzer 33 is used) is used as the pattern of image capturing instruction. This ringing pattern is a pattern which is different from normal operation (user operation) and which is not expected to occur in situations other than issuance of image capturing instruction.

In the camera-side process indicated in FIG. 6, when power is turned ON (S1), the camera device makes a transition to the sleep mode and stands by (S2). When a notification is issued, by interruption signal, etc., from the sound sensor 19 informing that sound energy has been detected; that is, when detecting sound energy (S3: YES), the refrigerator 1 makes a transition to the normal-operation mode (S4) and a judgement is made as to whether the pattern of the sound energy matches the pattern of the image capturing instruction (S5). In this example, the camera device 2 detects the ON/OFF edges of the sound energy and judges that the sound energy is an image capturing instruction when the edges are detected 10 or more times in 5 seconds for example.

When the detected pattern matches the pattern of the image capturing instruction (S5: YES), the camera device 2 captures the in-room image (S6) and transmits the captured image data to the mobile terminal 4 etc. or stores the captured image data to the server 6, etc. (S7) and a transition is thereafter made to the sleep mode of step S2. It is thus, possible to transmit the image capturing instruction to the camera device 2 in sleep mode through sound energy.

<Using Vibration Energy>

In the examples in which optical energy and sound energy were used, image capturing instruction was given by the user in real time. In this example, the image capturing instruction is preset to be given for capturing images when the door of the refrigerator 1 is opened/closed (when there is a possibility that status of items stored in the refrigerator 1 may have been changed). That is, the receiving unit is configured to be capable of receiving (accepting) image capturing instruction given based on preset conditions in addition to receiving image capturing instruction given in real time.

The refrigerator 1 executes the fridge-side process indicated in FIG. 9 and the camera device 2 executes the camera-side process indicated in FIG. 10. The process flow of the camera-side process indicated in FIG. 10 is substantially the same as the camera-side process indicated in FIG. 6 and thus, a description will be given in detail on the differences. In the fridge-side process indicated in FIG. 9, the refrigerator 1 judges whether the door has been opened/closed (R10) and stands by when the door has not been opened/closed (R10: NO). When the door has been opened/closed (R10: YES) on the other hand, the refrigerator 1 issues a notification that image capturing is ongoing (R11) and thereafter transmits image capturing instruction (R12) to the camera device 2 from the communication adaptor 34.

When power is turned ON (S10) in the camera-side process indicated in FIG. 10, transition is made to the sleep mode (S11) and judgment is made as to whether vibration (vibration energy) is detected (S12). When the door of the refrigerator 1 is opened/closed as described above, vibration is produced. When detecting vibration (S12: YES), the camera device 2 returns to the normal-operation mode (S13) and judges whether image capturing instruction has been received from the refrigerator 1 (S14). At step S14, the image capturing instruction is received through the communication module 17.

Then, when receiving an image capturing instruction (S14: YES), the camera device 2 captures an in-room image (S15) and transmits the captured image data or stores the captured image data to the server 6, etc. (S16) and a transition is thereafter made to the sleep mode. The data is transmitted to the mobile terminal 4, etc. at step S16. That is, when the door of the refrigerator 1 is opened/closed, the camera device 2 is configured to notify the user that the storage status of items, etc. stored in the refrigerator 1 may have changed in the form of captured image data.

It is thus, possible to transmit image capturing instruction by vibration energy to the camera device 2 in sleep mode.

<Using Optical Energy and Vibration Energy>

In this example, optical energy and vibration energy are used to capture images using camera device 2 alone, when the image capturing instruction is preset to be given when the door of the refrigerator 1 is opened/closed. The camera device 2 is configured to execute the camera-side process indicated in FIG. 11. The camera-side process indicated in FIG. 11 is substantially the same as the camera-side process indicated in FIG. 10 and thus, description will be given on the differences.

When the power is turned ON (S20) in the camera-side process indicated in FIG. 11, the camera device 2 makes a transition to the sleep mode (S21) and judges whether the optical energy has been detected (S22). When the door of the refrigerator 1 has been opened, the refrigerator 1 illuminates the in-room light 30 for example. Further, when the door has been opened, light is shed on the camera device 2 by the light outside the fridge. That is, it is possible to detect the opened/closed status of the door by detecting optical energy. Thus, when optical energy has been detected (S22: YES), the camera device 2 returns to the normal-operation mode (S23) assuming that the door of the refrigerator 1 has been opened.

Then, the camera device 2 judges whether the door is in a state corresponding to the door being closed (S24). The "state corresponding to the door being closed" indicates the state in which the door has been closed after being opened. More specifically, the following judgments are made at step S24.
a) Whether the time period in which optical energy was being detected was not a momentary but lasted for a time period that would be required for taking items, etc. out of the refrigerator 1.
b) Whether vibration energy produced when the door was closed has been detected.

The camera device 2 judges whether the door of the refrigerator 1 was opened/closed by making the above described judgments. When judging that the refrigerator 1 is in the "state corresponding to the door being closed" (S24: YES), in-room image is captured (S25) and the captured image data is transmitted or stored in the server 6, etc. (S26), whereafter transition is made to the sleep mode. The data is transmitted to the mobile terminal 4, etc. at step S26.

It is possible to transmit the image capturing instruction to the camera device 2 in sleep mode by combining optical energy with vibration energy.

The following effects can be obtained by the above described embodiments.

The camera device 2 is provided with the image capturing unit 11 configured to capture image of a room interior; the receiving unit configured to receive an image capturing instruction for capturing image of the room interior by way of a home appliance; and the camera-side controller 18 being configured to standby in a low-power mode consuming relatively less electric power compared to a normal-operation mode and being configured to capture image of the room interior through the image capturing unit by returning to the normal-operation mode when the receiving unit receives the image capturing instruction. It is thus not required to stand by in the normal-operation mode even when it is not possible to expect when image capturing instruction will be transmitted. As a result, it is possible to reduce electric power consumption when in standby. It is further possible to capture image of the room interior regardless of when the image capturing instruction is transmitted since the receiving unit is provided. It is thus, possible to suppress electric power consumption while allowing captured image data providing information of the room interior to be acquired at any given timing.

The image capturing instruction is configured to be transmitted through physical energy produced by home appliances and the receiving unit comprises the optical sensor 14, the sound sensor 19, the vibration sensor 20, etc. configured to detect the produced energy. It is thus, possible to utilize items provided to the home appliances such as the panel buzzer 29, in-room light 30, etc. for transmitting the image capturing instruction. Hence, it is possible to transmit image capturing instruction to the camera device 2 without providing additional components.

Components such as the in-room LED 32 and the in-room buzzer 33 may be provided which are dedicated to serve as the receiving unit. For example, it is possible to transmit the image capturing instruction without affecting the user by configuring the in-room LED 32 to produce light energy belonging to wavelength band exclusive of the wavelength band of visible light or by configuring the in-room buzzer 33 to produce sound energy of approximately 20 kHz or greater which is beyond the audible region.

The image capturing instruction is transmitted by producing energy in a predetermined pattern and image is captured provided that the detected pattern matches the produced pattern. It is thus, possible to reliably transmit the image capturing instruction without being affected by disturbance and thereby prevent detection errors and image capturing errors.

A transition is made to the sleep mode (low-power mode) when image capturing has been completed and the pattern of the detected energy and the pattern of the image capturing instruction do not match. It is thus, possible to reduce electric power consumption.

For example, when components preinstalled to the home appliance such as the panel buzzer 29 and the in-room light 30 are used, such components may produce energy apart from energy produced for issuing image capturing instruction. It is thus, possible to prevent image capturing errors by issuing the image capturing instruction in a pattern which will not be produced in normal operation (the flickering pattern indicated in FIG. 7, ringing pattern illustrated in FIG. 8, etc).

The in-room image capturing system 100 is configured by the camera device 2, an operation terminal such as the operation terminal 4, etc. configured to input the image capturing instruction to the camera device 2; and a home appliance provided with the communication adaptor 34 configured to receive the image capturing instruction given by the operation terminal and a transmitting unit (such as the in-room LED 32 and the panel buzzer 29) configured to transmit the received image capturing instruction to the camera device 2. It is thus, possible to suppress electric power consumption while allowing captured image data providing information of the room interior to be acquired at any given timing.

According to the embodiments described above, it is possible to provide a camera device, an in-room image capturing system, and an in-room information acquiring device capable of acquiring in-room information as one desires while suppressing electric power consumption.

(Other Embodiments)

Examples discussed in the above described embodiments may be modified or be combined in different ways for example as follows. Effects similar to those of the first embodiment can be achieved by such configurations as well.

The numerical values such as the flickering period, the ringing period, etc. disclosed in the embodiments are examples and may be modified as follows. When detecting optical energy, any pattern or judging standard may be employed instead of detecting the ON/OFF edges as long as the effect of ambient light can be suppressed. Examples of such patterns and judging standards include, whether the intensity (illuminance) of optical energy has exceeded a reference value, whether the ON/OFF period match, or whether the ON/OFF pulse width match.

In such case, optical energy may be specified to a wavelength band exclusive of the wavelength band of visible light such as an infrared light for example. When the camera device 2 is provided inside the room of the residence 7 and lighting equipment (visible light) is used as the transmitting unit, it is possible to transmit the image capturing instruction which is invisible to the human eye by specifying the flickering period to a period which is not discernable to the human eye (equal to or greater than approximately 30 Hz for example).

When detecting sound energy, any pattern or judging standard may be employed as long as the effect of external noise can be suppressed. Examples of such patterns and judging standards include, whether the intensity (the so-called sound pressure or dB value) of sound energy has exceeded a reference value, whether the ON/OFF period match, or whether the ON/OFF pulse width match.

In such case, it is possible to produce sound energy in the user's home that does not produce noise if ultrasonic wave exceeding the wavelength region exceeding the audible range of human (approximately 20 kHz or greater for example). It is possible to produce sound energy by elevating the rotational count of the blower 31 to a rotational count which is not used in normal operation (such as 2500 rpm) without using the panel buzzer 29 and the in-room buzzer 33 for example.

In one embodiment, the refrigerator 1 was given as an example of a home appliance. However, other types of home appliances may be employed instead. For example, it is possible to similarly capture the image inside the room of the residence 7 in addition to the image of the chamber interior of the refrigerator 1 using the camera device 2 by utilizing the sound produced by air conditioner or television. It is further possible to preset a frequency corresponding to image capturing instruction which is transmitted by sound energy belonging to a frequency band not competing with the frequency band of the home appliance. As for optical energy, an infrared transmitting/receiving portion configured to be capable of performing bi-directional infrared communication with the remote controller may be provided to the air conditioner. The infrared transmitting/receiving portion may be used as the transmitting unit. A washing machine may use a buzzer for notifying completion of operation, etc. as the transmitting unit.

In one embodiment, each of sensors configured to detect optical energy, sound energy, and vibration energy are provided. Alternatively, either one or two of the sensors may be provided.

In one embodiment, optical energy and vibration energy were combined. Alternatively, optical energy and sound energy may be combined or sound energy and vibration energy may be combined. Still alternatively, all of the foregoing energies may be combined. Each of the energies may be combined with one other when transmitting image capturing instruction in real time in addition to the above described case in which the image capturing instruction is given according to preset conditions such as when the door of the refrigerator 1 is opened/closed.

In one embodiment, image data captured using the camera device 2 was obtained as information of the room interior. Alternatively, other information may be acquired. That is, an information acquiring device configured to acquire information of a room interior such as image capturing data and sound data, etc. may comprise an information acquiring unit configured to acquire information of the room interior; a receiving unit configured to receive an acquiring instruction given to the information acquiring unit; and a controller configured to standby in a low-power mode consuming relatively less electric power compared to a normal-operation mode and being configured to control the information acquiring unit to acquire information of the room interior by returning to the normal-operation mode when the receiving unit receives the acquiring instruction. The above described configuration also achieves effects similar to those of the foregoing embodiments of suppressing power consumption while acquiring information of the room interior at any giving timing, for example.

In some embodiments, the optical energy is configured to flicker according to a period set to 30 Hz or greater.

In some embodiments, the optical energy is specified to a wavelength band exclusive of a wavelength band of visible light.

In some embodiments, the frequency band of the sound energy is specified to 20 kHz.

In some embodiments, the image capturing instruction is given by emitting the sound energy according to a pattern in which the sound energy is configured to ring intermittently according to a predetermined period.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A camera device comprising:
a camera provided inside a refrigerator and configured to capture an image of a room interior inside the refrigerator;
an optical sensor configured to receive an image capturing instruction for capturing the image of the room interior encoded in an optical energy emitted according to a predetermined pattern by an in-room lighting provided inside the refrigerator;
and a controller configured to standby in a low-power mode consuming relatively less electric power compared to a normal-operation mode and configured to capture the image of the room interior through the camera by returning to the normal-operation mode when the optical sensor detects the optical energy emitted according to the predetermined pattern by the in-room lighting.

2. The camera device according to claim 1, wherein the controller is configured to capture the image of the room interior when a pattern of energy detected by the optical sensor matches the pattern of energy given as the image capturing instruction.

3. The camera device according to claim 2, wherein the controller is configured to switch to the low-power mode when the pattern of energy detected by the optical sensor and the pattern of energy given as the image capturing instruction do not match and when image capturing by the camera is completed.

4. An in-room image capturing system comprising:
a refrigerator;
a camera device provided inside the refrigerator and including a camera configured to capture an image of a room interior inside the refrigerator, an optical sensor configured to receive an image capturing instruction for capturing the image of the room interior encoded in an optical energy emitted according to a predetermined pattern by an in-room lighting provided inside the refrigerator, and a controller configured to standby in a low-power mode consuming relatively less electric power compared to a normal-operation mode and configured to capture the image of the room interior through the camera by returning to the normal-operation mode when the optical sensor detects the optical energy emitted according to the predetermined pattern by the in-room lighting;

an operation terminal configured to input the image capturing instruction to the camera device; and a home appliance provided with a transceiver communication unit configured to receive the image capturing instruction given by the operation terminal and a transmitting unit the in-room lighting configured to transmit the image capturing instruction received by the transceiver communication unit to the camera device by emitting the optical energy according to the predetermined pattern.

5. An in-room information acquiring device comprising:
a sensor provided inside a refrigerator configured to acquire information of a room interior inside the refrigerator;
an optical sensor configured to receive an acquiring instruction given to the information acquiring unit encoded in an optical energy emitted according to a predetermined pattern by an in-room lighting provided inside the refrigerator;
and a controller configured to standby in a low-power mode consuming relatively less electric power compared to a normal-operation mode and configured to control the sensor to acquire the information of the room interior by returning to the normal-operation mode when optical sensor detects the optical energy emitted according to the predetermined pattern by the in-room lighting.

* * * * *